United States Patent
Upadhyaya et al.

(10) Patent No.: US 9,740,673 B2
(45) Date of Patent: Aug. 22, 2017

(54) PRESENTATION OF HIERARCHICAL DATA IN MULTIPLE CONSISTENT VIEWS

(75) Inventors: Anadi Upadhyaya, Hyderabad (IN); Ty V. Hayden, Grand Junction, CO (US); Krishnaraj Mahadevan, Hyderabad (IN)

(73) Assignee: Oracle International Corporation, Redwood Shores, CA (US)

( * ) Notice: Subject to any disclaimer, the term of this patent is extended or adjusted under 35 U.S.C. 154(b) by 521 days.

(21) Appl. No.: 13/235,568

(22) Filed: Sep. 19, 2011

(65) Prior Publication Data

US 2012/0084708 A1 Apr. 5, 2012

Related U.S. Application Data

(60) Provisional application No. 61/384,252, filed on Sep. 18, 2010.

(51) Int. Cl.
| | |
|---|---|
| *G06F 3/00* | (2006.01) |
| *G06F 17/24* | (2006.01) |
| *G06Q 10/00* | (2012.01) |
| G06F 3/0481 | (2013.01) |
| G06F 3/0484 | (2013.01) |

(52) U.S. Cl.
CPC .......... *G06F 17/245* (2013.01); *G06Q 10/00* (2013.01); *G06F 3/0481* (2013.01); *G06F 3/0484* (2013.01)

(58) Field of Classification Search
CPC ....................................... G06F 3/0481–3/0489
USPC ......................................... 715/781, 778, 853
See application file for complete search history.

(56) References Cited

U.S. PATENT DOCUMENTS

| | | | | |
|---|---|---|---|---|
| 5,255,356 | A * | 10/1993 | Michelman | G06F 17/246 715/212 |
| 5,838,965 | A * | 11/1998 | Kavanagh | G06F 9/4448 |
| 6,205,453 | B1 * | 3/2001 | Tucker | G06F 17/30336 715/201 |
| 6,978,422 | B1 * | 12/2005 | Bushe et al. | 715/734 |
| 7,519,923 | B2 * | 4/2009 | Peterson | G06F 3/0482 715/853 |
| 7,617,243 | B2 * | 11/2009 | Ramanathan et al. | |
| 7,640,496 | B1 * | 12/2009 | Chaulk et al. | 715/243 |
| 7,925,989 | B2 * | 4/2011 | Hofmann et al. | 715/793 |
| 8,327,256 | B2 * | 12/2012 | Choudhury | 715/214 |
| 8,560,971 | B2 * | 10/2013 | Duquene | G06F 3/0482 707/828 |
| 8,671,363 | B2 * | 3/2014 | Choudhury | 715/853 |

(Continued)

*Primary Examiner* — Steven B Theriault
(74) *Attorney, Agent, or Firm* — Sheppard Mullin Richter & Hampton LLP

(57) ABSTRACT

Hierarchical data can be consistently presented in multiple different views. One method involves extracting object information describing at least one object from a database. The object information includes hierarchical information indicating a position of the object within a hierarchy of objects and list information usable to sort of list of objects that includes the object. The method also generates a tree view and a list view for display within a hierarchical data presentation window. The tree view identifies the object, and generation of the tree view is based upon the hierarchical information. The list view identifies the at least one object, and generation of the list view is based upon the list information. The method provides the tree and list views to a display device for display within the hierarchical data presentation window.

23 Claims, 5 Drawing Sheets

(56) References Cited

U.S. PATENT DOCUMENTS

| | | |
|---|---|---|
| 2003/0081007 A1* | 5/2003 | Cyr et al. .................. 345/804 |
| 2003/0184588 A1* | 10/2003 | Lee .................. G06Q 30/02 715/772 |
| 2003/0210278 A1* | 11/2003 | Kyoya et al. ................. 345/810 |
| 2003/0218640 A1* | 11/2003 | Noble-Thomas ............. 345/853 |
| 2004/0032413 A1* | 2/2004 | Fuller ................. G06T 11/206 345/440 |
| 2004/0243616 A1* | 12/2004 | Benhase .............. G06F 9/4443 |
| 2005/0066293 A1* | 3/2005 | Hunt .................... G06F 3/0481 715/854 |
| 2005/0071765 A1* | 3/2005 | Hallisey et al. ............. 715/734 |
| 2005/0262452 A1* | 11/2005 | Sauermann .......... G06F 3/0482 715/853 |
| 2006/0107196 A1* | 5/2006 | Thanu .................. G06F 17/246 715/217 |
| 2007/0050697 A1* | 3/2007 | Lewis-Bowen ....... G06F 17/246 715/212 |
| 2007/0150485 A1* | 6/2007 | Uittenbogaard ...... G06F 3/0482 |
| 2007/0276846 A1* | 11/2007 | Ramanathan ........ G06Q 10/107 |
| 2008/0040690 A1* | 2/2008 | Sakai ................ G06F 17/30126 715/853 |
| 2008/0250318 A1* | 10/2008 | Walter ......................... 715/713 |
| 2009/0049372 A1* | 2/2009 | Goldberg ............. G06F 17/245 715/227 |
| 2009/0064036 A1* | 3/2009 | Nagai ............... G06F 17/30861 715/808 |
| 2009/0089657 A1* | 4/2009 | Davis ................ G06F 17/30882 715/234 |
| 2009/0138500 A1* | 5/2009 | Yuan et al. ................ 707/103 R |
| 2009/0187815 A1* | 7/2009 | Becerra, Sr. ........ G06F 3/04815 715/212 |
| 2009/0235155 A1* | 9/2009 | Ueda .................... G06F 17/241 715/233 |
| 2009/0327928 A1* | 12/2009 | Dedis et al. .................. 715/763 |
| 2010/0106543 A1* | 4/2010 | Marti ............................... 705/7 |

\* cited by examiner

PRESENTATION OF HIERARCHICAL DATA IN MULTIPLE CONSISTENT VIEWS

RELATED APPLICATIONS

This application claims the domestic benefit under Title 35 of the United States Code §119(e) of U.S. Provisional Patent Application Ser. No. 61/384,252, entitled "Fusion Compensation Hierarchy View Switcher," filed Sep. 18, 2010, and naming Anadi Upadhyaya, Ty Haden, and Krishnaraj Mahadevan as the inventors, which is hereby incorporated by reference in its entirety and for all purposes as if completely and fully set forth herein.

FIELD OF THE INVENTION

This invention relates to computing and, more particularly, to presenting data for display to and manipulation by a user.

DESCRIPTION OF RELATED ART

Typically, Enterprise Application Systems (EAS) allow users to view hierarchical data in tree format. Such a tree format uses indentation to differentiate different levels of the hierarchy. At each level, the user can be presented with options to expand or collapse the presentation of lower-level data within the hierarchy. Similarly, a user can be allowed to select which node of the hierarchy to view, such that only hierarchical data corresponding to that node is presented. Unfortunately, existing EAS systems are not flexible enough to allow users to view hierarchical data in formats other than this tree format, and it is often difficult to provide tree format viewing experiences that include functionality associated with other non-tree formats.

SUMMARY

Various systems and methods for consistently presenting hierarchical data in multiple different views are disclosed. In one embodiment, a method involves extracting object information describing at least one object from a database stored on a storage device. The object information includes hierarchical information indicating a position of the object within a hierarchy of objects and list information usable to sort a list of objects that includes the object. The method also generates a tree view and a list view for display within a hierarchical data presentation window. The tree view identifies the object, and generation of the tree view is based upon a first portion of the object information that includes the hierarchical information. The list view identifies the at least one object, and generation of the list view is based upon a second portion of the object information that includes the list information. The method provides the tree view and the list view to a display device for display within the hierarchical data presentation window. The method can be performed by a computing device implementing a hierarchical data interface.

A system can include one or more processors and memory coupled to the one or more processors. The memory stores program instructions executable to perform a method like the one described above. Similarly, such program instructions can be stored upon a computer readable storage medium.

The foregoing is a summary and thus contains, by necessity, simplifications, generalizations and omissions of detail; consequently those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

A more complete understanding of the present invention may be acquired by referring to the following description and the accompanying drawings, in which like reference numbers indicate like features.

Figure 1:
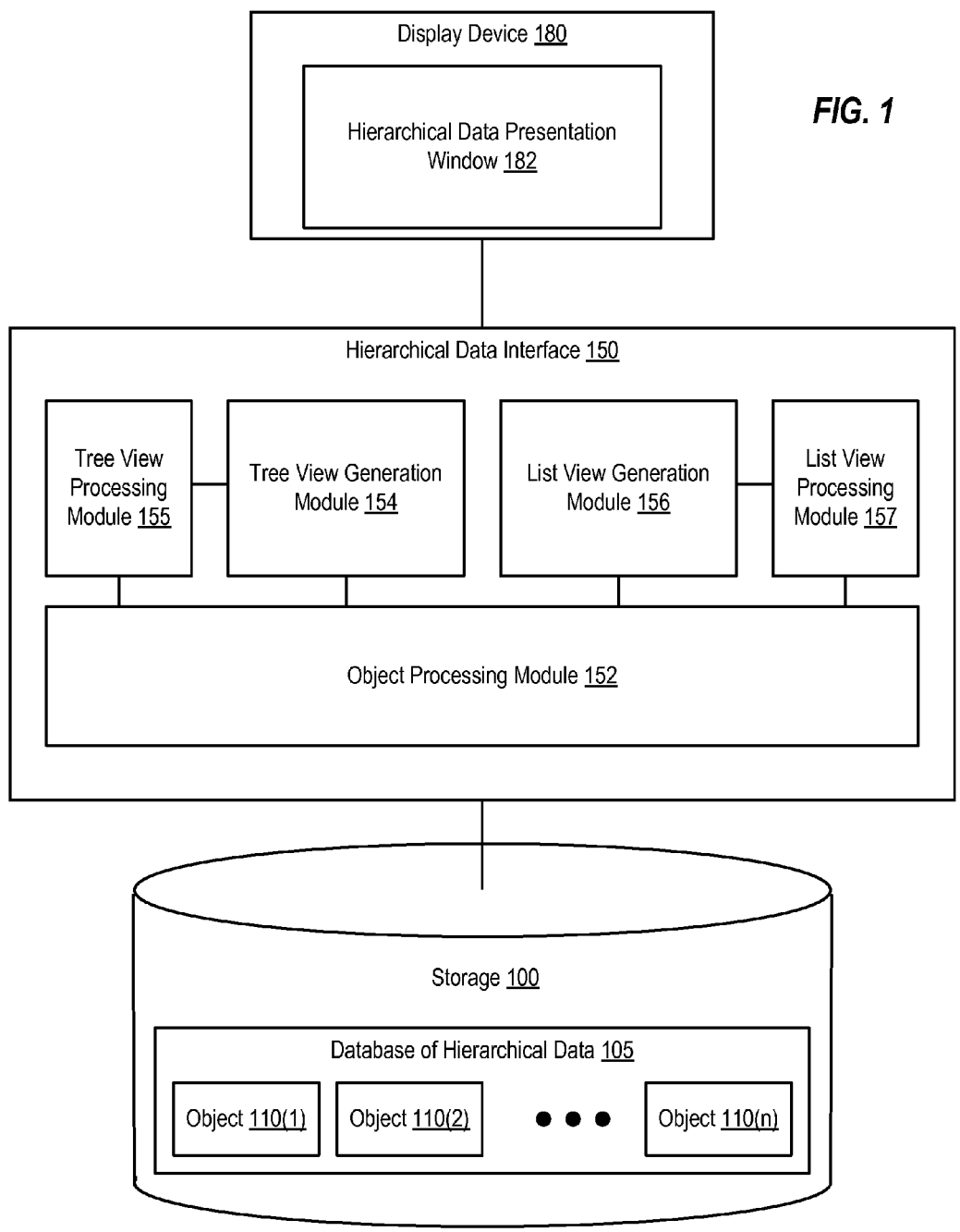
FIG. 1 illustrates a block diagram of a system for presenting hierarchical data to a user using multiple consistent views, according to one embodiment.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION

FIG. 1 illustrates a block diagram of a system for presenting hierarchical data to a user using multiple consistent views. As illustrated, the system includes a storage device 100 that stores a database of hierarchical data 105, which includes several data describing multiple objects 110(1)-110(n). Storage device 100 is coupled to a hierarchical data interface 150, which includes an object processing module 152, a tree view generation module 154, a tree view processing module 155, a list view generation module 156, and a list view processing module 157. Hierarchical data interface 150 is coupled to display device 180, which displays a hierarchical data presentation window 182.

Hierarchical data interface 150 is configured to present multiple different views, including a hierarchical tree view and a non-hierarchical list view, of the information stored in database 105. Hierarchical data interface 150 also allows one or more users to modify both the presentation of this information and the information itself via these different views. Hierarchical data interface 150 may also cause such modifications to be reflected across all of the different views. For example, if a user modifies an object (by either modifying the object itself or by modifying how the object is presented within the display) while interacting with the object in tree view, hierarchical data interface 150 can operate to cause the modification to be visible when the user subsequently views the object in list view.

Figure 2A:
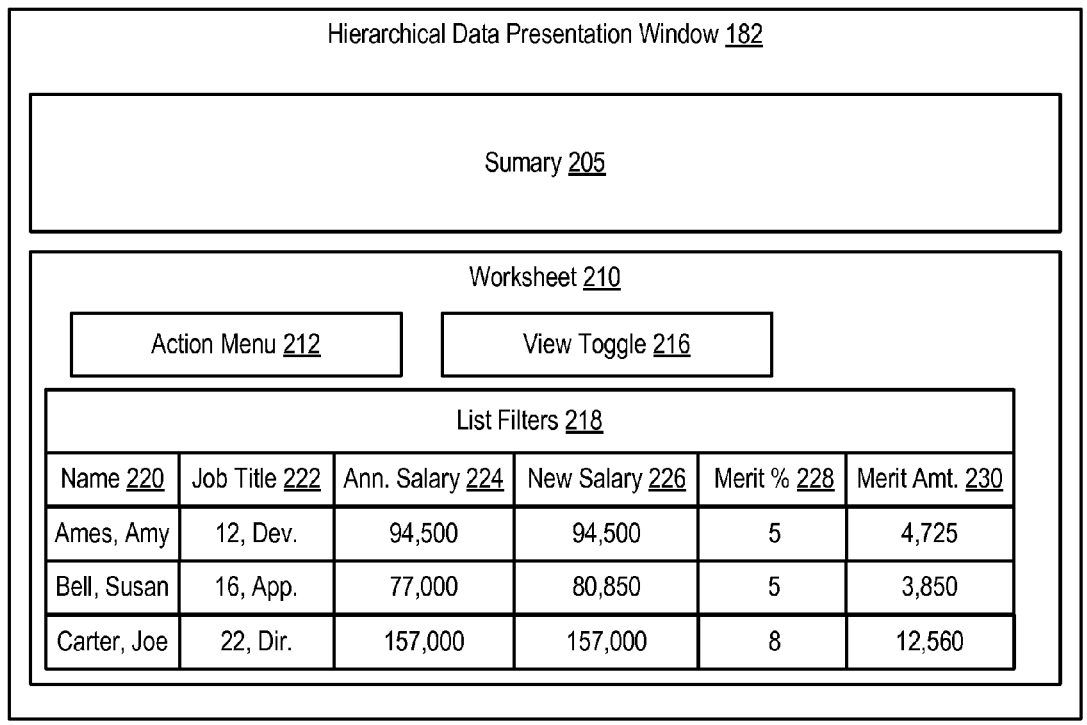
FIG. 2A illustrates an example of a list view within a hierarchical data presentation window, according to one embodiment.
Figure 2B:
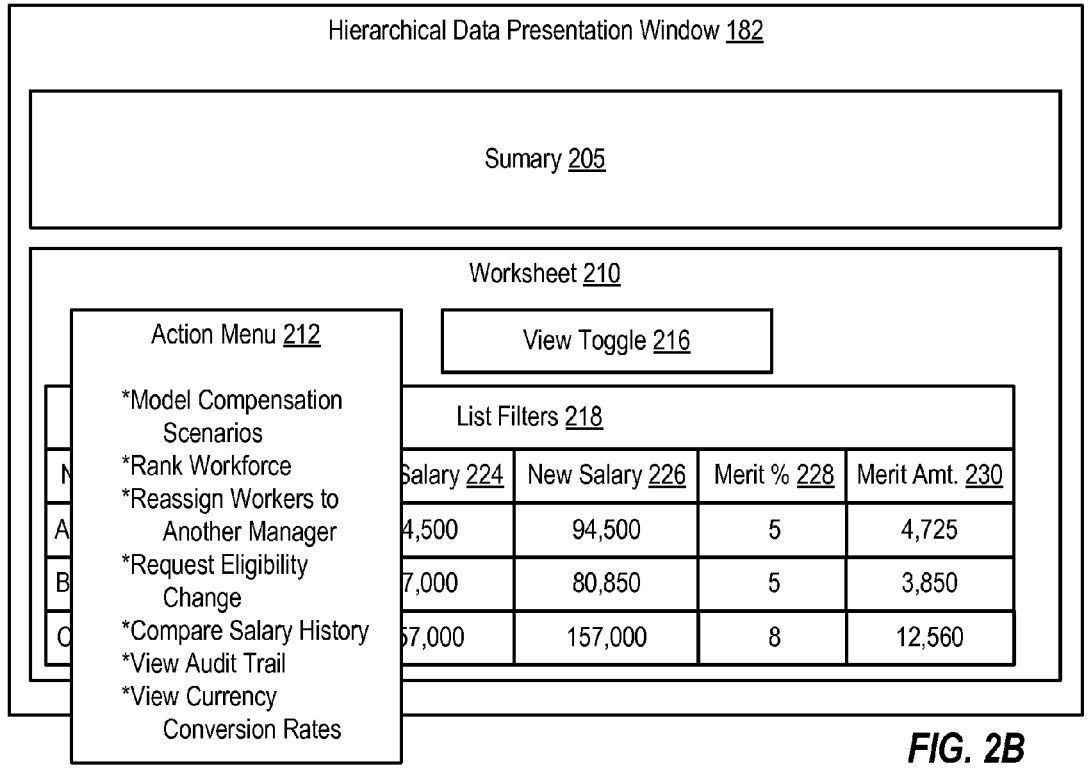
FIG. 2B illustrates an example of actions available when displaying a list view within a hierarchical data presentation window, according to one embodiment.
Figure 2C:
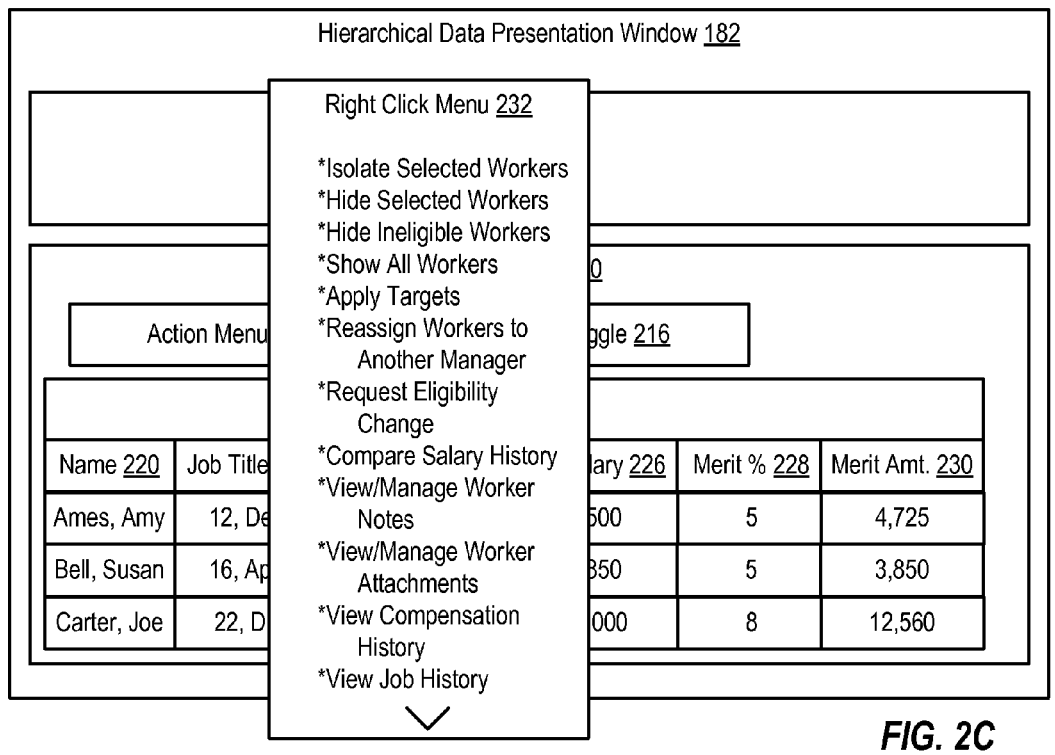
FIG. 2C illustrates an example of a right click menu available when displaying a list view within a hierarchical data presentation window, according to one embodiment.
Figure 2D:
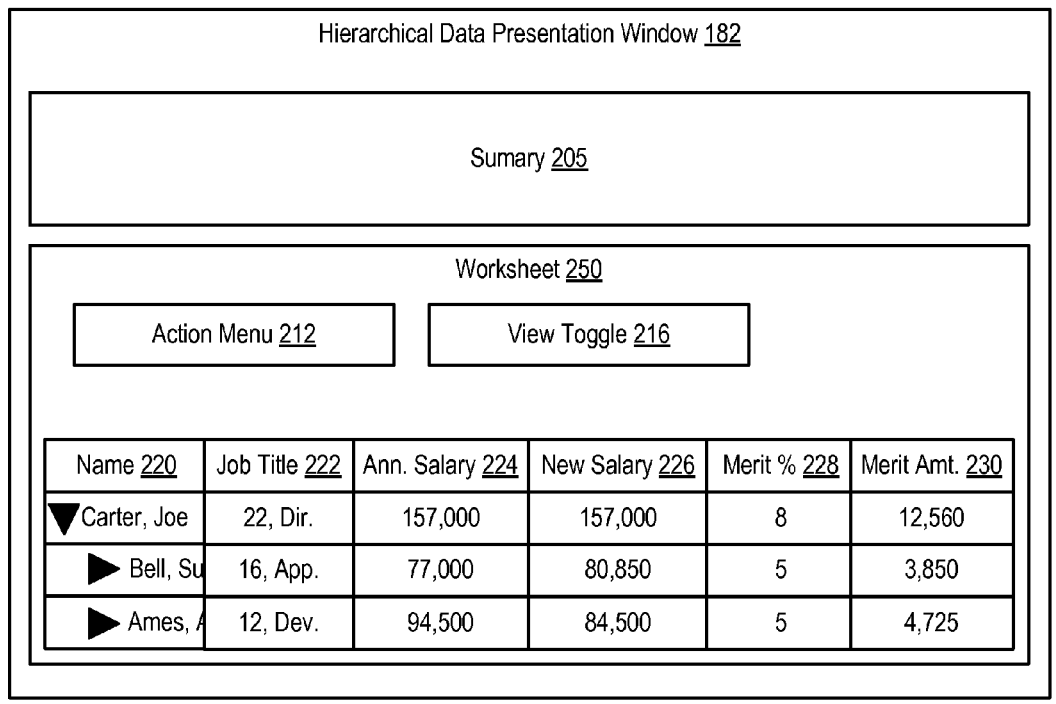
FIG. 2D illustrates an example of a tree view within a hierarchical data presentation window, according to one embodiment.

Tree view generation module 154 is configured to generate a tree view of one or more of the objects stored in database 105 that can be displayed within hierarchical data presentation window 182 of display device 180. A tree view includes graphical and/or textual information, which can include the arrangement of graphical and/or textual information identifying various objects relative to each other, that indicates the hierarchical relationship between objects. Thus, a tree view can arrange objects so that child objects that are children of the same parent object are grouped together, and so that the child-parent relationship between the child objects and the parent object is apparent. For example, the child object names can be arranged in rows underneath a row containing the parent object's name. The names of the child objects can be indented (e.g., shifted right) with respect to the location of the parent object's name. An example of a tree view is shown in FIG. 2D.

When a user interacts with objects in the tree view, any user requests to modify the objects or the presentation of the objects within the tree view can be provided to tree view processing module 155. Tree view processing module 155 can identify the type of request being made and appropriately modify the set of object information that should be included within the tree view subsequent to the request. For example, if a request is a request to hide certain object information, that information can be removed from the set of object information that should be represented in the new tree view. If additional object information is needed from database 105 to satisfy the request (e.g., in order to display object information that was previously hidden within the tree view), tree view processing module 155 can cause object processing module 152 to extract that information from the database. After modifying the set of object information, tree view processing module 155 provides the updated set of object information to tree view generation module 154, which generates a tree view of the updated set of object information and provides the tree view to display device 180 for display within hierarchical data presentation window 182. Tree view processing module 155 can also provide information identifying any modifications that were made to the presentation of and/or content of the objects to object processing module 152.

A user can interact with the tree view in order to identify the hierarchical relationships between objects. The tree view can also allow a user to hide or expand the presentation of children objects for a particular parent object. For example, an arrowhead graphic next to the name of an object can point toward the right of the window when no children of the object are to be displayed. The user can interact with (e.g., by clicking or otherwise selecting) the arrowhead graphic until the arrowhead graphic points towards the bottom of the window, which in turn causes tree view processing module 155 and tree view generation module 154 to operate to update the tree view (in a manner referred to as expanding) to include information identifying any objects that are children of the object in one or more rows underneath the object. A view can include expanded child information some objects while simultaneously hiding child information for other objects. Similarly, different hierarchical relationships can be expanded to different degrees within the view, such that one object can be expanded to show both children and grandchildren, while another object is only expanded to show children. Some tree views can also allow a user to select to only view certain objects (or even just a single object and its children, if any), as opposed to requiring the user to view all of the objects within database 105.

List view generation module 156 is configured to generate a list view of one or more of the objects stored in database 105 for display within hierarchical data presentation window 182 of display device 180. A list view includes graphical and/or textual representation of objects that allows the objects to be sorted based upon one or more object characteristics. For example, a list view can present textual information identifying each object in a respective row. Similarly characteristics (e.g., such as names) of different objects can be grouped within the same column. Relative to a tree view, a list view is considered a "flat" view, since the arrangement of objects within the list view does not provide any graphical indication of the hierarchical relationships between objects. Examples of a list view are shown in FIGS. 2A, 2B, and 2C.

Similarly to when viewing objects in the tree view, when a user interacts with objects in the list view, any user requests to modify the objects or the presentation of the objects within the list view can be provided to list view processing module 157. List view processing module 157 can identify the type of request being made and appropriately modify the set of object information that should be included within the tree view and/or modify the arrangement of that information subsequent to the request. If additional object information is needed from database 105 to satisfy the request, list view processing module 157 can cause object processing module 152 to extract that information from the database. After modifying the set of object information, list view processing module 157 provides the updated set of object information to list view generation module 156, which generates a list view of the updated set of object information and provides the list view to display device 180 for display within hierarchical data presentation window 182. List view processing module 157 can also provide information identifying any modifications that were made to the presentation of and/or content of the objects to object processing module 152.

A user can interact with the objects within the list view in order to sort, search, or filter the objects by one of the characteristics. For example, the user can request to sort the displayed objects alphabetically by name. In response to the user's request, list view processing module 157 and list view generation module 156 can operate to update the list view to identify the objects in the requested order. Sorting can be performed based upon value (e.g., lowest to highest or highest to lowest), based upon alphabetical order (e.g., ascending or descending), based upon ranges (e.g., excluding objects having characteristics within the range or excluding objects having characteristics outside of the range), based upon whether certain characteristics (like certain flags) are present or not within the object, and the like.

Users can also search for particular characteristics while viewing objects in a list view. For example, the user can search for all objects having a characteristic that has particular value or falls within a particular range of values (or, alternatively, that lacks such a value or falls outside of that range of values). In response, list view processing module 157 and list view generation module 156 can operate to update the list view to only show objects that satisfy the search query. Searching can performed based upon one or more different characteristics.

Filtering involves excluding certain objects from being displayed within the list view based upon the characteristics of those objects. For example, if one of the characteristics is a date, the user can specify a date range for a particular characteristic. In response to the user's specification, list view processing module 157 and list view generation module 156 can operate to update the list view such that objects having the characteristic within the date range will be displayed in the list view, while other objects that do not have the characteristic within the date range will be hidden in the list view. Filtering can be performed based upon any characteristic values, including alphanumeric characters (e.g., to show only objects having names that begin with certain letters), ranges of dates or other values, and the like.

As noted briefly above, object processing module 152 is configured to extract information about one or more objects from database 105 and to pass relevant portions of that information to tree view generation module 154 (if the user has requested that a tree view of the one or more objects be displayed) and to list view generation module 156 (if the user has requested that a list view of the one or more objects be displayed). Certain information is only relevant to certain views. For example, information identifying each object's position within a hierarchy (e.g., such as information identifying a parent object and/or one or more child objects) may only be displayed within a tree view. Accordingly, when a list view is requested, object processing module 152 will provide information about the one or more objects, but not this hierarchy-specific information, to list view generation module 156.

Object processing module 152 can also keep track of any user modifications to objects that are currently being displayed. For example, a user may create a new object, rename an existing object, delete an existing object, or modify the contents of an existing object. Whenever a modification is made to an object being displayed in a particular view, the appropriate view processing module (list view processing module 157 or tree view processing module 155) will provide information identifying the modification to object processing module 152. Object processing module 142 will store this information and provide this information to the appropriate view generation module whenever the user subsequently requests to switch views.

As a user switches between views, object processing module 152 can provide updated information reflecting any modifications to objects to the appropriate view generation module, such that modifications made in one view will subsequently be displayed in other views. Once the user chooses to save such modifications (e.g., by selecting a "save" option within hierarchical data presentation window 182), object processing module 152 can update database 105 to reflect the modifications.

In addition to tracking user modifications to objects themselves, object processing module 152 can also track user modifications to how objects are displayed within hierarchical data presentation window 182 throughout a user viewing session. Such modifications can include hiding particular object characteristics from view or expanding a view to display previously hidden object characteristics, as briefly discussed above. Additional types of presentation modifications can include resizing particular columns or rows, selecting certain objects, rows, columns or the like (e.g., such that the selected item is displayed in a special manner, which could include boldfacing text, changing the color of the graphical and/or textual portion of the item, or otherwise highlighting the difference between the selected item and any non-selected items) reordering columns (e.g., such that one column is moved from the left of another column to the right of the other column), "freezing" the displayed information (e.g., so that a scrolling feature is not enabled), and the like. Such presentation modifications can be requested by clicking (or otherwise selecting) various graphical and/or textual elements within the display, moving a selected graphical and/or textual element, accessing a menu option from a drop-down or popup menu, selecting an icon or text element in a toolbar, and the like. Whenever a modification is made to the presentation of an object being displayed in a particular view, the appropriate view processing module (list view processing module 157 or tree view processing module 155) will provide information identifying the presentation modification to object processing module 152. Object processing module 142 will store this information and provide this information to the appropriate view generation module whenever the user subsequently requests to switch views.

As an example, a user can initially view a set of objects in tree view. While interacting with the objects in tree view, a user may select to hide certain characteristics of the objects. Object processing module 152 can detect this modification to the presentation of the set of objects and temporarily store information indicating the modification (e.g., within random access memory (RAM) or another form of local storage). The user can subsequently switch to viewing the set of objects within list view. In response to detecting the user's request to switch views, object processing module 152 can provide the information identifying the modification to the presentation of the set of objects to list view generation module 156, allowing list view generation module 156 to generate a list view of the set of objects in which the characteristics that were hidden from view in the tree view remain hidden from view in the list view. If the user subsequently expands the information in the list view to include the previously-hidden characteristics and then switches back to tree view, hierarchical data interface 150 will operate to case the tree view to also display the previously-hidden characteristics.

It is noted that object processing module 152 that is configured to extract all of the information—including information usable in either the list or the tree view but not in the other view—about a given object from database 105, even if some of that information is not immediately needed for the current view. This way, if a user switches between views, the necessary information to include within that view can be obtained (if not already obtained) from database 105. As such, both the tree view and list view provide representations of the same database. This leads to the tree view and list view being consistent with each other, since both are generated from the same underlying database. Furthermore, saving modifications made in one view and presenting those modifications in the other further ensures consistency between views.

As noted above and shown in FIG. 1, both the tree view and the list view are displayed within the same hierarchical data presentation window 182. This window can be part of a graphical user interface (GUI) or command line interface (CLI) provided by an application that includes hierarchical data interface 150. In some embodiments, the application can be a web-based application that users interact with via a web browser, and thus hierarchical data presentation window 182 can be a web browser or other client and hierarchical data presentation window 182 can be part of a web server or configured to provide tree and list views to such a web server for inclusion in web content being sent to web clients. By displaying the list and tree views within the same window that is part of the same user interface, the look and feel of the user interface remains similar even when the user switches between views.

While the above example focuses on a system that provides two views of hierarchical data, other embodiments may provide other views. For example, one system may provide several types of list views and/or several types of tree views. Some systems may also provide additional views in addition to tree and list views.

Storage device 100 provides persistent data storage, such that data stored on such a storage device will remain stored even after the storage device is powered off. Such a storage device can be, for example, a hard disk, a compact disc (CD), a digital versatile disc (DVD), or other mass storage device, or a storage system (e.g., a redundant array of independent disks (RAID) system or an optical storage jukebox) that includes an array of such storage devices. Such a storage device can also be a virtual or logical storage device that is implemented on such physical storage devices and/or storage systems. For example, such a storage device can be a logical volume that is implemented on a RAID storage system. Additionally, such a storage device can include one or more storage devices. A storage device can also include one or more types of storage media, including solid state media (e.g., Flash drives), optical media (e.g., CDs and DVDs), and magnetic media (e.g., hard disks or magnetic tape). In some embodiments, such storage devices can be implemented using cloud storage, in which the storage device is a logical storage device to which physical storage device(s) are allocated on an as-needed and/or as-contracted basis.

Display device 180 is configured to display graphical and/or textual information to a user. A display device can include an output-only device such as a cathode ray tube (CRT), liquid crystal display (LCD), or plasma monitor. Alternatively, a display device such as a touch screen display can provide both input and output functionality, allowing a user to modify objects and/or object presentation directly via the display device.

Display device 180, hierarchical data interface 150, and storage 100 can be coupled directly (e.g., via a bus, local wireless link, or other appropriate interconnect) or indirectly (e.g., via a network). In one embodiment, these elements are each coupled by one or more networks, which may include a WAN (Wide Area Network), such as the Internet, one or more LANs (Local Area Networks), and/or one or more SANs (Storage Area Networks).

FIGS. 2A-2D provide examples of different views that can be generated by a hierarchical data interface such as hierarchical data interface 150 of FIG. 1. For the purposes of these examples, the hierarchical data interface is part of a compensation system that allows appropriate employees to view and manage the compensation of employees within an organization. Accordingly, in this example, the objects being displayed are objects within a compensation database, such as objects representing employees or groups of employees.

FIG. 2A illustrates an example of how a list view can be included within a hierarchical data presentation window. In this example, hierarchical data presentation window 182 includes a summary 205 and a worksheet 210. Worksheet 210 is a list view of a set of compensation objects. As shown, worksheet 210 includes an action menu 212, which, when selected (as shown in FIG. 2B), includes information identifying one or more actions that can be performed in the list view.

Worksheet 210 also includes view toggle 216, which is a graphical and/or textual element such as a button, image, link, or the like that, when selected, will cause a tree view to be displayed instead of the list view (e.g., as shown in FIG. 2D). In one embodiment, view toggle 216 can indicate that the view will switch upon selection of view toggle 216 (e.g., "View as Tree" when included within a list view, or "View as List" when included within a tree view).

Worksheet 210 also includes one or more list filters 218. List filters 218 can include one or more user input fields or menus that allow a user to filter which objects are currently displayed within worksheet 210. List filters 218 may also include a field that allows a user to specify a search query and/or one or more fields that allow a user to request that the listed objects be sorted.

The listed objects within worksheet 210 are arranged so that each object is displayed in a separate row. Common characteristics of different objects are displayed in the same column. The first row of the list identifies these characteristics: name 220, job title 222, annual (Ann.) salary 224, new salary 226, merit percentage (%) 228, and merit amount (Amt.) 230. It is noted that many other characteristics may be included instead of and/or in addition to those shown here.

The next row of the list identifies an object that represents employee Amy Ames. As shown, this row identifies Amy Ames by name and also identifies Amy's job title (identified by a numerical identifier and an abbreviation "Dev" for developer), Amy's annual salary ($94,500), Amy's new salary (e.g., after incorporating a raise), the percentage (5%) of Amy's annual salary to be provided as a merit reward, and the amount of Amy's merit reward ($4,725, or 5% of $94,500).

The next row identifies an object that represents employee Susan Bell. This row identifies Susan's job title (16, "App." for application programmer), annual salary ($77,000), new salary ($80,850, which reflects a raise equal to Susan's merit award), merit percentage (5%), and merit amount ($3,850).

The row after that identifies an object that represents employee Joe Carter. This row identifies Joe's job title (22, "Dir." for director), annual salary ($157,000), new salary ($157,000) merit percentage (8%), and merit amount ($12,560).

Additional objects may also be included within the list. A user can view those objects by accessing scrolling functionality (e.g., a scroll bar, not shown). A user can restrict the number of objects displayed within the list by selecting to filter the list by entering information in list filters 218. For example, the user can restrict the list to objects that contain non-zero values of "Merit %."

Currently, the list is sorted alphabetically by last name. A user could request to sort the list in a different manner. For example, selection of the text representing "Ann. Salary" 224 could cause the list to be sorted in ascending annual salary amount. Selecting that text again could cause the list to be sorted by descending annual salary amount.

A user could resize one or more of the columns and/or rows. A user could also choose to hide or expand one or more of the columns or rows (e.g., by selecting an option within a menu accessed by right-clicking on the column or row to be hidden). A user can also perform actions such as freezing and reordering columns within the list view provided by worksheet 210.

A user can edit information within worksheet 210. For example, the user could update Susan's merit percentage to 6%. In response to making such a change, the hierarchical data interface will keep track of the modification and cause the modified merit percentage value to be displayed in tree view if the user later switches to tree view. Additionally, the hierarchical data interface will cause the modification to be applied to the database if the user chooses to save the modification (e.g., by selecting a "save" button, not shown, within hierarchical data presentation window 182).

A user can also edit the presentation of the information within worksheet 210. For example, the user can select to hide the "New Salary" column. In response to the user's making such a change, the hierarchical data interface will keep track of the presentation modification and cause the presentation modification to be included in tree view if the user later switches to tree view. Thus, if the user subsequently switches to tree view by selecting view toggle 216, the tree view will also hide the "New Salary" column.

Summary region 205 can display information summarizing the information currently displayed in worksheet 210. For example, the summary can show the total merit amount awarded to all employees currently displayed in worksheet 210. The summary 205 can be updated by the hierarchical data interface as information is expanded, hidden, and/or filtered within worksheet 210. The summary can be updated each time a new view version of the view is generated (e.g., in response to a user modifying the presentation of objects within the view), as well as each time the user toggles between types of views.

FIG. 2B illustrates an example of actions available when displaying a list view within a hierarchical data presentation window. Here, the user has selected action menu 212, and now a set of action menu options are displayed. Since the user is currently viewing the objects within list view, the action menu only identifies options that can be performed within list view. Options that can only be performed within tree view are not included within action menu 212 while in list view. (Alternatively, if action menu 212 is selected while in tree view, a different set of options that include all options that can be performed within tree view and none of the options that can only be performed within list view will be displayed.)

FIG. 2C illustrates an example of a right click menu 232 available when displaying a list view within a hierarchical data presentation window. This menu can be accessed by, for example, right-clicking on a section of worksheet 210. Since the user is currently viewing the objects within list view, right click menu 232 only identifies options that can be performed within list view. Options that can only be performed within tree view are not included within right click menu 232 while in list view. (Alternatively, if right click menu 232 is selected while in tree view, a different set of options that include all options that can be performed within tree view and none of the options that can only be performed within list view will be displayed.)

FIG. 2D illustrates an example of a tree view within a hierarchical data presentation window. Here, the hierarchical data presentation window includes a different worksheet, worksheet 250, instead of worksheet 210 (shown in FIGS. 2A, 2B, and 2C). Worksheet 250 is a tree view of the same set of object information that was displayed in list view in worksheet 210.

As shown, worksheet 250 includes action menu 212 and view toggle 216. However, unlike worksheet 210, worksheet 250 does not include any list filters 218. In this tree view, Joe Carter is shown as a parent object that has two children objects: the object representing Susan Bell and the object representing Amy Ames. Thus, the tree view indicates that Joe is Susan and Amy's manager. The arrowhead next to Joe's name is currently pointing downward, indicating that child objects are being displayed. In contrast, the arrowheads next to Amy and Susan are pointing towards the right, indicating that child objects are not currently displayed for Amy and Susan.

As can be seen in FIG. 2D, many of the graphical elements within the tree view are also present within the list view shown in FIGS. 2A-2C. Thus, tree views and list views can share common graphical and/or textual elements. One such common element can be a view toggle element such as view toggle 216 (in some embodiments, the text presented on view toggle can vary depending upon which view currently includes the view toggle, as described above with respect to FIG. 2A).

Many features can also be shared between tree view and list view. For example, in the same manner as described above with respect to the list view of FIG. 2A, the columns and rows of the tree view can be resized, reordered, hidden, frozen, and the like. Accordingly, the hierarchical data presentation window can include common menu options (e.g., available via menus, toolbars, and the like) corresponding to these features in both the tree view and the list view.

Other features are not shared between tree view and list view. For example, as noted above, the list filters available in list view are not shown in the tree view of worksheet 250. Thus, while tree view and list view can share certain common elements, other elements may not be common to both views.

Figure 3:
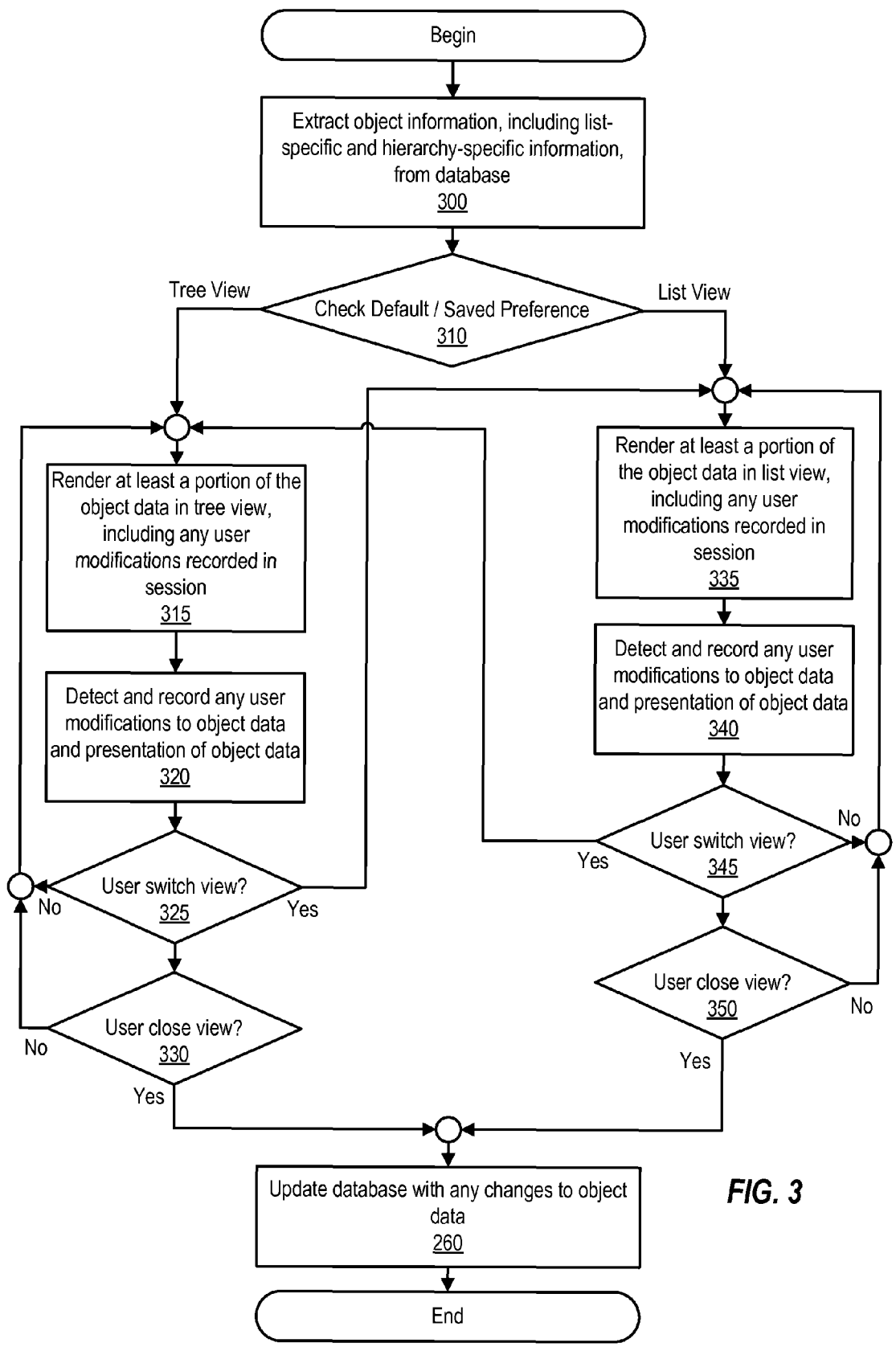
FIG. 3 is a flowchart of a method of consistently displaying hierarchical data within multiple views, according to one embodiment.

FIG. 3 is a flowchart of a method of consistently displaying hierarchical data within multiple views. This method can be performed by a hierarchical data interface such as hierarchical data interface 150 of FIG. 1.

The method begins at 300, where object information, including list-specific and hierarchy-specific information, is extracted from a database. This operation can be performed in response to receiving a use request to view the object information in the database. The object information can include information about one or more objects that are stored in the database. Once the information has been extracted from the database, the information can be temporarily stored (e.g., in local storage such as a local hard drive, Flash memory, and/or RAM) for later processing.

The list-specific information includes information that can be consumed and/or displayed within a list view of the object information. This can include information identifying the name of each object within the object information, as well as information identifying one or more characteristics or properties of each object. Each item of information (e.g., name, particular property, and the like) can be used to sort or filter objects within a list view. For example, the names of several objects can be sorted alphabetically while the objects are being displayed within a list view. Similarly, a range of values of a particular property can be used to filter out the display (within a list view) of objects having property values outside of that range.

At least some of this list-specific information may not be consumed and/or displayed within a tree view. For example, the list-specific information may identify or facilitate operations (e.g., such as the list filters 218 of FIGS. 2A-2C) that can be performed to modify the presentation of data within a list view but not within a tree view.

The hierarchy-specific information includes information that can be consumed and/or displayed within a tree view of the object information. This can include information identifying or otherwise indicating (e.g., through the use of pointers or references to database keys or other identifiers) the parent and/or child objects associated with a given object. Thus, if an object is the root of the hierarchy, that hierarchy-specific information for that object may only indicate child objects, not a parent object. Similarly, if an object has no children, the hierarchy-specific information for that object may only indicate a parent object, not any child objects.

Similarly to the way in which at least some the list-specific information may not be used while in tree view, at least some of the hierarchy-specific information may not be displayed and/or consumed within a list view. For example, a list view may not indicate the parent and/or child relationships between objects.

A default and/or saved preference can be accessed, as shown at 310, to determine which view—tree or list—to generate first. Such a preference may, in some cases, be selected based upon the identity of the user. For example, when a user requests access to the hierarchical information, a set of one or more saved preferences can be accessed to see if that user has previously saved any preference. If so, the user's previously saved preference can be accessed. Otherwise, a default preference may be used. If no default or saved preference is available, the user can be prompted to select either tree view or list view.

A default preference may apply to multiple users. Such a preference may be hardcoded (e.g., by the developer of the hierarchical data interface) or set by an administrator (e.g., when initially configuring the hierarchical data interface for use) or other user with appropriate privileges. For example, the manager of a particular division within a company may configure a default view for users within that particular division.

Once the appropriate view to initially generate has been identified at 310, the identified view is generated from the object data. Thus, if the default or saved preference is tree view, at least a portion of the object information accessed at 300 is rendered in tree view, as shown at 320. As used herein, "render" refers to the process of generating graphical content, such as that illustrated in the example screenshots of FIGS. 2A-2D, in a format that can be provided to and displayed on (perhaps after additional processing by a graphic-specific processor) a display device. Here, rendering the object information in tree view involves presenting the object information in a format that clearly indicates the hierarchical relationship between at least some of the objects, based upon the child and parent relationships identified within the information extracted from the database.

After generating the tree view, any user modifications to the object data and/or to the presentation of the object data are detected and tracked, as indicated at 320. Detecting such modifications can involve detecting user input provided via an input device such as a touch screen, keyboard, mouse, stylus, or the like. Tracking the modifications can involve storing information identifying the modifications, including any new values to be included within the object.

If the user subsequently decides to switch to list view, as detected at 325, at least a portion of the object data extracted at 300, as well as any information tracked at 320, will be used to render a list view of the object data, as shown at 335. As in the tree view, any modifications made while in list view can be detected and recorded, as shown at 340.

As indicated by operations 325 and 345, a user can continue to switch between tree and list views. Each time the user switches views, operations 315 and 335 are performed in manner that causes any prior modifications, even if made in another view, to be included within the current view.

If the user subsequently decides to close the view (e.g., by selecting to exit an application including the hierarchical data interface), as detected at 330 for tree view or 350 for list view, the database can be updated with any changes to the object data that were detected and tracked in either operation 320 or operation 340. (If a user chooses to exit without saving, this operation may be omitted.)

Other operations can be included instead of and/or in addition to those shown in FIG. 3. Additionally, the operations shown in FIG. 3 can be performed in a different order than shown in FIG. 3. For example, instead of extracting all information prior to deciding the type of view, the process could involve identifying the initial type of view to display and then extracting only the information pertinent to that view. When the user subsequently switches views, any additional information needed for the other view could then be extracted.

Figure 4:
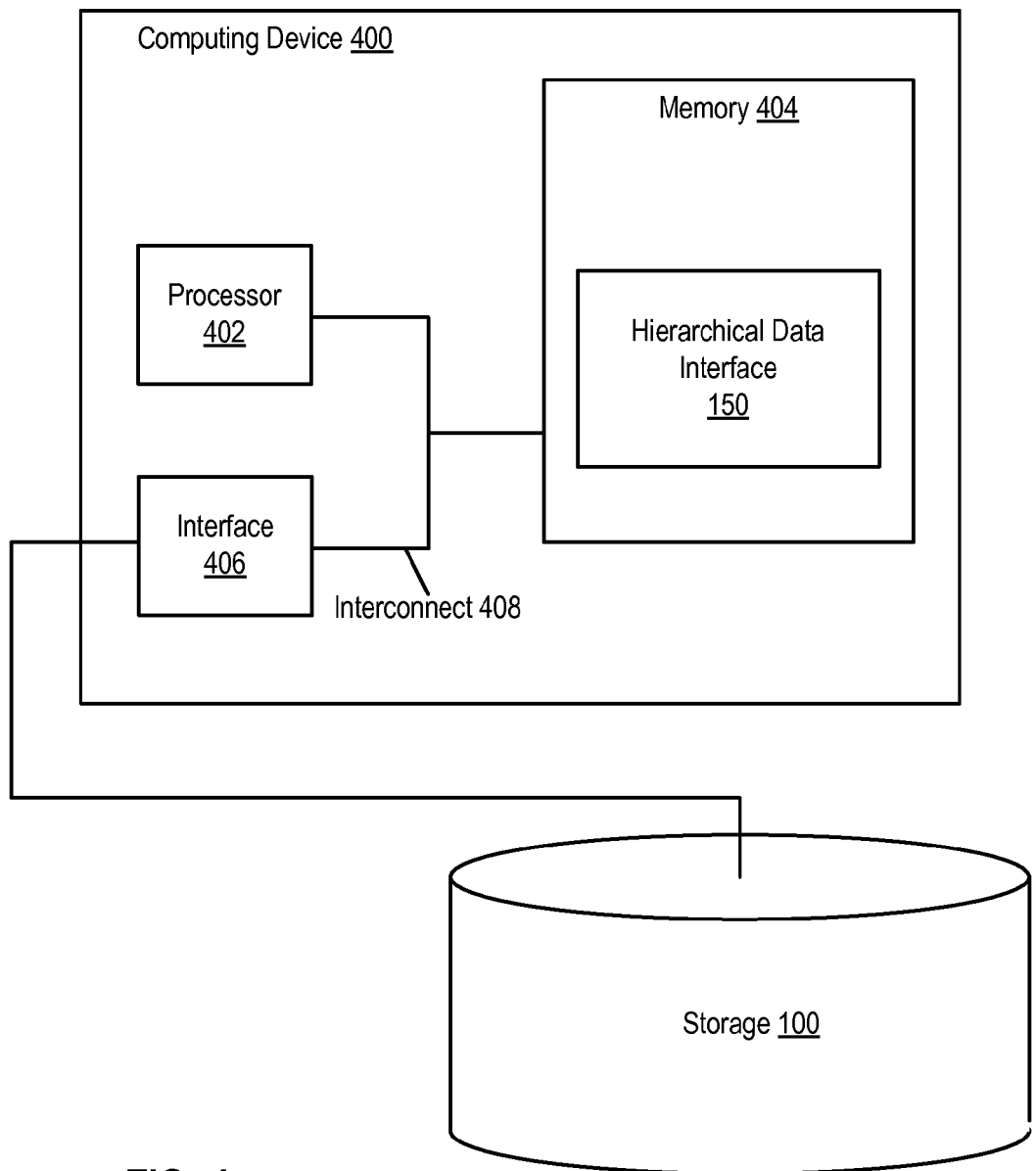
FIG. 4 is a block diagram of a computing device, illustrating how a hierarchical data interface can be implemented in software in at least one embodiment.

FIG. 4 is a block diagram of a computing device 400 that illustrates how a hierarchical data interface 150 (e.g., such as hierarchical data interface 150 of FIG. 1) can be implemented in software. Computing device 400 can be a personal computer, network appliance, server, personal digital assistant, mobile phone, storage controller (e.g., an array controller, tape drive controller, or hard drive controller), laptop computer, or the like. In general, computing device 400 is configured to execute software or otherwise provide appropriate functionality to consistently display hierarchical data in multiple views as described herein.

As illustrated, computing device 400 includes one or more processors 402 (e.g., microprocessors, Programmable Logic Devices (PLDs), or Application Specific Integrated Circuits (ASICs)) configured to execute program instructions stored in memory 404. Memory 4004 can include various types of Random Access Memory (RAM), Read Only Memory (ROM), Flash memory, Micro Electro-Mechanical Systems (MEMS) memory, magnetic core memory, and the like. Memory 404 can include both volatile and non-volatile memory.

Computing device 400 also includes one or more interfaces 406 (e.g., such as interfaces to a storage device, network, user output device such as a display device, user input device such as a mouse, touch screen, or keyboard, and the like). Processor 402, interface 406, and memory 404 are coupled to send and receive data and control signals by a bus or other interconnect.

Interface 406 can include a network interface to various networks and/or interfaces to various peripheral buses. For example, interface 406 can include a network interface via which user input requesting various manipulations of hierarchical data or the display of such hierarchical data is received. Interface 406 can also include an interface to one or more storage devices (e.g., such as a storage device, like storage 100 of FIG. 1, storing a database of hierarchical data).

In this example, program instructions and data executable to implement all or part of hierarchical data interface 150 are stored in memory 404. The program instructions and data implementing hierarchical data interface 150 can be stored on various computer readable storage media such as memory 404. In some embodiments, such software is stored on a computer readable storage medium such as a Compact Disc (CD), Digital Versatile Disc (DVD), hard disk, optical disk, tape device, floppy disk, and the like). In order to be executed by processor 402, the instructions and data can be loaded into memory 404 from the other computer readable storage medium. The instructions and/or data can also be transferred to computing device 400 for storage in memory 404 via a network such as the Internet or upon a carrier medium.

Although the present invention has been described in connection with several embodiments, the invention is not intended to be limited to the specific forms set forth herein.

On the contrary, it is intended to cover such alternatives, modifications, and equivalents as can be reasonably included within the scope of the invention as defined by the appended claims.

What is claimed is:

1. A method comprising:
   extracting object information from a database, wherein
      the object information describes an object,
      the database is stored in a storage device,
      the object information comprises
         hierarchical information indicating a position of the object within a hierarchy of objects, and
            list information usable to sort a list of objects that comprises the object;
   generating a tree view of the object information for display within a hierarchical data presentation window, the hierarchical data presentation window presented on a display of a computing device, wherein
      the tree view identifies the object,
      the generating the tree view is based upon a first portion of the object information, and
      the first portion comprises the hierarchical information;
   generating a list view of the object information for display within the hierarchical data presentation window, wherein
      the list view identifies the object,
      the generating the list view is based upon a second portion of the object information,
      the second portion comprises the list information,
      the tree view and the list view are generated for the same object, and
      the tree view displays substantially the same list information as the list view;
   displaying one of the tree view or the list view in the hierarchical data presentation window;
   receiving a first user input to hide a first piece of information while in the one of the tree view or the list view;
   in response to the first user input, hiding the first piece of information in the one of the tree view or the list view;
   detecting a user request to switch from the one of the tree view or the list view to the other of the tree view or the list view; and
   in response to the detecting, replacing the one of the tree view or the list view with the other of the tree view or the list view in the hierarchical data presentation window, wherein
      the replacing the one of the tree view or the list view with the other of the tree view or the list view in the hierarchical data presentation window comprises continuing to hide the first piece of information in the other of the tree view or the list view,
      the extracting the object information, the generating the tree view, the generating the list view, the detecting, the displaying, the receiving, the hiding, and the replacing are performed by the computing device implementing a hierarchical data interface presented by the hierarchical data presentation, and
      the hierarchical data presentation window further comprises a summary window, further wherein
         the summary window comprises information related to a first subset of a plurality of objects when the list view is displayed within the hierarchical data presentation window, the first subset of the plurality of objects being selected based on one or more filters selected in the list view, and
         the summary window comprises information related to all of the plurality of data objects when the tree view is displayed in the hierarchical data presentation window.

2. The method of claim 1, wherein
   the tree view and the list view share at least one of a common graphical control element or a menu option, and
   the at least one of the common graphical element or the menu option is selectable to control at least one of
      a modification to the object, or
      a modification to how the object is displayed within the hierarchical data presentation window.

3. The method of claim 1, further comprising:
   receiving a second user input while one of the tree view or the list view is being displayed within the hierarchical data presentation window, wherein
      the second user input is configured to create a modified object by virtue of being configured to modify the object;
   displaying the modified object in the one of the tree view or the list view;
   receiving a third user input;
   detecting another user request to switch from the one of the tree view or the list view to the other of the tree view or the list view, wherein
      the detecting is performed subsequent to the receiving the third user input, and
      the third user input comprises the another user request; and
   in response to the detecting the another user request, displaying the modified object in the other of the tree view or the list view, wherein
      the displaying the other of the tree view or the list view comprises
      displaying the modified object.

4. The method of claim 1, wherein
   both the tree view and the list view comprise
      a graphical switching element, and
      user selection of the graphical switching element switches between the tree view and the list view.

5. The method of claim 1, wherein
   the list view comprises
      a first menu option, and
      a second menu option,
   the first menu option is not included in the tree view, and
   the second menu option is included in the tree view.

6. The method of claim 1, wherein the object is a compensation system object.

7. The method of claim 1, further comprising:
   detecting a default view, wherein
      one of the tree view or the list view is generated in response to being the default view, and
      the other one of the tree view or the list view is generated in response to a user selecting to switch views while the default view is displayed.

8. A system comprising:
   one or more processors; and
   a memory in communication with the one or more processors, the memory storing program instructions executable by the one or more processors to extract object information from a database, wherein
      the object information describes an object,
      the database is stored in a storage device,
      the object information comprises
         hierarchical information indicating a position of the object within a hierarchy of objects, and list information usable to sort a list of objects that comprises the object, generate a tree view of the object information for display within a hierarchical data presentation window, the hierarchical data presentation window presented on a display of a computing device, wherein
  the tree view identifies the object,
  generation of the tree view is based upon a first portion of the object information, and
  the first portion comprises the hierarchical information, generate a list view of the object information for display within the hierarchical data presentation window, wherein
  the list view identifies the object,
  generation of the list view is based upon a second portion of the object information,
  the second portion comprises the list information,
  the tree view and the list view are generated for the same object, and
  the tree view displays substantially the same list information as the list view, display one of the tree view or the list view in the hierarchical data presentation window, receive a first user input to hide a first piece of information while in the one of the tree view or the list view, in response to the first user input, hide the first piece of information in the one of the tree view or the list view detect a user request to switch from the one of the tree view or the list view to the other of the tree view or the list view, and in response to the detection of the user request, replace the one of the tree view or the list view with the other of the tree view or the list view in the hierarchical data presentation window, wherein
  the replacement of the one of the tree view or the list view with the other of the tree view or the list view in the hierarchical data presentation window comprises continuing to hide the first piece of information in the other of the tree view or the list view, and
  the hierarchical data presentation window further comprises a summary window, further wherein
    the summary window comprises information related to a first subset of a plurality of objects when the list view is displayed within the hierarchical data presentation window, the first subset of the plurality of objects being selected based on one or more filters selected in the list view, and
    the summary window comprises information related to all of the plurality of data objects when the tree view is displayed in the hierarchical data presentation window.

9. The system of claim 8, wherein
the tree view and the list view share at least one of a common graphical control element or a menu option, and
the at least one of the common graphical element or the menu option is selectable to control at least one of a modification to the object or a modification to how the object is displayed within the hierarchical data presentation window.

10. The system of claim 8, wherein the program instructions are further executable to:
receive a second user input while one of the tree view or the list view is being displayed within the hierarchical data presentation window, wherein
  the second user input is configured to create a modified object by virtue of being configured to modify the object;
display the modified object in the one of the tree view or the list view;
receive a third user input;
detect another user request to switch from the one of the tree view or the list view to the other of the tree view or the list view, wherein
  the detecting is performed subsequent to receipt of the third user input, and
  the third user input comprises the another user request; and
in response to the detection of the another user request, display the modified object in the other of the tree view or the list view, wherein
display of the other of the tree view or the list view comprises display of the modified object.

11. The system of claim 8, wherein
both the tree view and the list view comprise
  a graphical switching element, and
  user selection of the graphical switching element switches between the tree view and the list view.

12. The system of claim 8, wherein
the list view comprises
  a first menu option, and
  a second menu option,
the first menu option is not included in the tree view, and
the second menu option is included in the tree view.

13. The system of claim 8, wherein the object is a compensation system object.

14. The system of claim 8, wherein the program instructions are further executable to:
detect a default view, wherein
  one of the tree view or the list view is generated in response to being the default view, and
  the other one of the tree view or the list view is generated in response to a user selecting to switch views while the default view is displayed.

15. A non-transitory computer-readable storage medium comprising program instructions that, when executed by at least one processor of a computing system, cause the computing system to perform a method comprising:
extract object information from a database, wherein
  the object information describes an object,
  the database is stored in a storage device,
  the object information comprises
    hierarchical information indicating a position of the object within a hierarchy of objects, and
    list information usable to sort a list of objects that comprises the object;
generate a tree view of the object information for display within a hierarchical data presentation window, the hierarchical data presentation window presented on a display of a computing device, wherein
  the tree view identifies the object,
  generation of the tree view is based upon a first portion of the object information, and
  the first portion comprises the hierarchical information;
generate a list view of the object information for display within the hierarchical data presentation window, wherein
  the list view identifies the object,
  generation of the list view is based upon a second portion of the object information,
  the second portion comprises the list information, the tree view and the list view are generated for the same object, and the tree view displays substantially the same list information as the list view;

display one of the tree view or the list view in the hierarchical data presentation window;

receive a first user input to hide a first piece of information while in the one of the tree view or the list view;

in response to the first user input, hide the first piece of information in the one of the tree view or the list view;

detect a user request to switch from the one of the tree view or the list view to the other of the tree view or the list view; and in response to the detection of the user request, replace the one of the tree view or the list view with the other of the tree view or the list view in the hierarchical data presentation window, wherein the replacement of the one of the tree view or the list view with the other of the tree view or the list view in the hierarchical data presentation window comprises continuing to hide the first piece of information in the other of the tree view or the list view, and the hierarchical data presentation window further comprises a summary window, further wherein the summary window comprises information related to a first subset of a plurality of objects when the list view is displayed within the hierarchical data presentation window, the first subset of the plurality of objects being selected based on one or more filters selected in the list view, and the summary window comprises information related to all of the plurality of data objects when the tree view is displayed in the hierarchical data presentation window.

16. The non-transitory computer-readable storage medium of claim 15, wherein the tree view and the list view share at least one of a common graphical control element or a menu option, and the at least one of the common graphical element or the menu option is selectable to control at least one of a modification to the object or a modification to how the object is displayed within the hierarchical data presentation window.

17. The non-transitory computer-readable storage medium of claim 15, wherein the program instructions are further executable to:

receive a second user input while one of the tree view or the list view is being displayed within the hierarchical data presentation window, wherein the second user input is configured to create a modified object by virtue of being configured to modify the object;

display the modified object in the one of the tree view or the list view;

receive a third user input;

detect another user request to switch from the one of the tree view or the list view to the other of the tree view or the list view, wherein the detecting is performed subsequent to receipt of the third user input, and the third user input comprises the another user request; and in response to the detection of the another user request, display the modified object in the other of the tree view or the list view, wherein display of the other of the tree view or the list view comprises display of the modified object.

18. The non-transitory computer-readable storage medium of claim 15, wherein both the tree view and the list view comprise
a graphical switching element, and
user selection of the graphical switching element switches between the tree view and the list view.

19. The non-transitory computer-readable storage medium of claim 15, wherein the list view comprises
a first menu option, and
a second menu option,
the first menu option is not included in the tree view, and
the second menu option is included in the tree view.

20. The non-transitory computer-readable storage medium of claim 15, wherein the object is a compensation system object.

21. The non-transitory computer-readable storage medium of claim 15, wherein the program instructions are further executable to:

detect a default view, wherein one of the tree view or the list view is generated in response to being the default view, and the other one of the tree view or the list view is generated in response to a user selecting to switch views while the default view is displayed.

22. The method of claim 1, further comprising:

detecting another user request;

identifying a type of request of the another user request; and if the tree view is displayed, performing tree view processing, wherein the tree view processing results in a modification to the object information, and the modification to the object information is reflected in the tree view.

23. The method of claim 1, further comprising:

detecting another user request;

identifying a type of request of the another user request; and if the list view is displayed, performing list view processing, wherein the list view processing results in a modification to the object information, and the modification to the object information is reflected in the list view.

* * * * *

UNITED STATES PATENT AND TRADEMARK OFFICE
CERTIFICATE OF CORRECTION

PATENT NO. : 9,740,673 B2
APPLICATION NO. : 13/235568
DATED : August 22, 2017
INVENTOR(S) : Upadhyaya et al.

It is certified that error appears in the above-identified patent and that said Letters Patent is hereby corrected as shown below:

In the Drawings

On sheet 2 of 5, in FIG. 2A, under Reference Numeral 205, Line 1, delete "Sumary" and insert -- Summary --, therefor.

On sheet 2 of 5, in FIG. 2B, under Reference Numeral 205, Line 1, delete "Sumary" and insert -- Summary --, therefor.

On sheet 3 of 5, in FIG. 2D, under Reference Numeral 205, Line 1, delete "Sumary" and insert -- Summary --, therefor.

Signed and Sealed this
Twenty-second Day of May, 2018

Andrei Iancu
*Director of the United States Patent and Trademark Office*